United States Patent
Kruglick

(10) Patent No.: US 9,634,881 B2
(45) Date of Patent: Apr. 25, 2017

(54) RELIABILITY IN DISTRIBUTED ENVIRONMENTS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/264,223

(22) PCT Filed: Feb. 3, 2011

(86) PCT No.: PCT/US2011/023592
§ 371 (c)(1),
(2), (4) Date: Oct. 13, 2011

(87) PCT Pub. No.: WO2012/105980
PCT Pub. Date: Aug. 9, 2012

(65) Prior Publication Data
US 2013/0311628 A1    Nov. 21, 2013

(51) Int. Cl.
G06F 15/173 (2006.01)
H04L 12/24 (2006.01)
G06F 9/445 (2006.01)
G06F 9/50 (2006.01)
G06F 11/34 (2006.01)

(52) U.S. Cl.
CPC ............... *H04L 41/00* (2013.01); *G06F 8/61* (2013.01); *G06F 9/5055* (2013.01); *G06F 11/3409* (2013.01); *Y02B 60/183* (2013.01)

(58) Field of Classification Search
CPC .... H04L 41/00; H04L 67/1097; H04L 41/042
USPC .................................................. 709/223, 203
See application file for complete search history.

(56) References Cited

U.S. PATENT DOCUMENTS

| | | | |
|---|---|---|---|
| 8,271,987 B1 * | 9/2012 | Willeford et al. | 718/104 |
| 8,819,042 B2 * | 8/2014 | Samudrala | G06F 17/30557 707/758 |
| 2003/0120792 A1 | 6/2003 | Celik et al. | |
| 2007/0118496 A1 * | 5/2007 | Bornhoevd | H04L 67/327 |
| 2007/0198554 A1 | 8/2007 | Liu | |
| 2009/0132864 A1 | 5/2009 | Garbow | |

(Continued)

FOREIGN PATENT DOCUMENTS

KR    1020030011111 A    2/2003

OTHER PUBLICATIONS

International Search Report and Written Opinion dated Aug. 11, 2011 in PCT Application No. PCT/US11/23592.

(Continued)

*Primary Examiner* — Hua Fan
*Assistant Examiner* — Karina J Garcia-Ching
(74) *Attorney, Agent, or Firm* — Moritt Hock & Hamroff LLP; Steven S. Rubin, Esq.

(57) ABSTRACT

Technologies are generally described herein for deploying an application in a ubiquitous computing system. An allocation module may receive a command to deploy the application having multiple application modules to various nodes in the ubiquitous computing system. For at least one application module, the allocation module may identify, within the ubiquitous computing system, a set of heterogeneous nodes capable of executing the application module and having greater diversity over other sets of nodes in the ubiquitous computing system. The allocation module may deploy the application to the set of heterogeneous nodes.

19 Claims, 8 Drawing Sheets

(56) References Cited

U.S. PATENT DOCUMENTS

| | | | |
|---|---|---|---|
| 2009/0222509 A1* | 9/2009 | King et al. | 709/203 |
| 2010/0050181 A1 | 2/2010 | Zhang | |
| 2010/0095301 A1 | 4/2010 | Suh et al. | |
| 2012/0102032 A1* | 4/2012 | Byrne | G06F 17/30294 707/737 |

OTHER PUBLICATIONS

Sharman, R., et al., "Functionality defense by heterogeneity: a new paradigm for securing systems," 37th Hawaii International Conference on System Sciences, 2004.

Ghosh, Deet al., "Self-healing systems-survey and synthesis," Decision Support Systems 42, No. 4 (2007): 2164-2185, 2007.

Forrest, S., et al., "Building Diverse Computer Systems," In Proceedings of the Sixth Workshop on Hot Topics in Operating Systems, 1997.

Ahmed, S. et al., "ETC (Efficient, Transparent, and Secured) Self-Healing Service for Pervasive Computing Applications," International Journal of Network Security, vol. 4, No. 3, pp. 271-281, May 2007.

Albonesi, D., "Selective Cache Ways: On-Demand Cache Resource Allocation," Proceedings of the International Symposium on Microarchitecture, 12 pages, Nov. 1999.

Bala, et al., "Dynamo: A Transparent Dynamic Optimization System," Proceedings of Programming Language Design and Implementation, 12 pages, Jun. 2000.

Baraz, et al., "IA_32 Execution Layer: A Two-Phase Dynamic Translator Designed to Support IA-32 Application on Itanium®-based Systems," Proceedings of the 36th International Symposium on Microarchitecture, 11 pages, Dec. 2003.

Dehnert, et al., "The Transmeta Code Morphing™ Software: Using Speculation, Recovery, and Adaptive Retranslation to Address Real-Life Challenges," ACM International Conference Proceedings Series, vol. 37, Proceedings of the International Symposium on Code Generation and Optimization: Feedback-directed and Runtime Optimization, Abstract, 9 pages, 2003.

Ebcioglu, et al., "DAISY: Dynamic Compilation for 100% Architectural Compatibility," Proceedings of the 24th International Symposium on Computer Architecture, 13 pages, 1997.

Microsoft .NET Framework, http://www.microsoft.com/net/, accessed Oct. 13, 2009, 1 page.

Inverardi, P., et al., "Correct deployment and adaptation of software application on heterogeneous (mobile) devices," Proceedings of the First Workshop on Self-Healing Systems, 2002.

Khandani, E. et al., "Reliability and Route Diversity in Wireless Networks," 2005 Conference on Information Sciences and Systems, The Johns Hopkins University, Mar. 16-18, 2005.

Combs, N., and Vagle, J., "Adaptive mirroring of system of systems architectures," in Proceeding WOSS '02 Proceedings of the first workshop on Self-healing systems, 2002, pp. 96-98.

Greenhalgh, C., et al., "Addressing Mobile Phone Diversity in Ubicomp Experience Development," UbiComp 2007: Ubiquitous Computing, Lecture Notes in Computer Science vol. 4717, 2007, pp. 447-464.

Kaiser, G., et al., "An Approach to Autonomizing Legacy Systems," Columbia University, Programming Systems Lab Department of Computer Science, 2002, pp. 1-6.

Valetto, G., and Kaiser, G., "A case study in software adaptation," in Proceeding WOSS '02 Proceedings of the first workshop on Self-healing systems, 2002, pp. 73-78.

Xu, J., et al., "Transparent Runtime Randomization for Security," Center for Reliable and High-Performance Computing Coordinated Science Laboratory, 2003, pp. 1-23.

* cited by examiner

Fig. 2

| | OPERATING SYSTEM ~204A | MEMORY AVAILABLE ~204B | MEMORY USE OVER TIME ~204C | HARDWARE ID ~204D | VIRTUAL MACHINE ID ~204E |
|---|---|---|---|---|---|
| 202A → A | 1 | 2GB | 0 | 1001 | 1001 |
| 202B → B | 2 | 250MB | 0 | 3521 | 2001 |
| 202C → C | 1 | 50MB | -2MB/SEC | 2001 | 1351 |
| 202D → D | 1 | 1GB | 0 | 1001 | 1001 |
| 202E → E | 3 | 2GB | +6MB/SEC | 3521 | 3001 |
| 202F → F | 4 | 2GB | -2MB/SEC | 4001 | 1001 |

108

RELIABILITY IN DISTRIBUTED ENVIRONMENTS

CROSS-REFERENCE TO RELATED APPLICATION

The present application is a U.S national stage filing under 35 U.S.C. §371 of International Application No. PCT/US11/23592, filed on Feb. 3, 2011.

BACKGROUND

Unless otherwise indicated herein, the materials described in this section are not prior art to the claims in this application and are not admitted to be prior art by inclusion in this section.

A distributed application may include various tasks. A distributed environment may include distributed nodes, each of which may be configured to execute one or more of the tasks. For each task in the distributed application, a controller may assign the task to multiple homogenous nodes capable of executing the task. Having homogenous nodes executing the same task may provide redundancy. However, homogenous nodes may be susceptible to similar faults, thereby negating any potential increase in reliability afforded by the redundancy.

SUMMARY

The present disclosure generally describes some methods for deploying an application in a ubiquitous computing system. Some example methods may include receiving a command to deploy the application in the ubiquitous computing system. The application may include an application module. The methods may also include identifying a set of heterogeneous nodes in the ubiquitous computing system capable of executing the application module and having greater diversity over other sets of nodes in the ubiquitous computing system. The methods may further include deploying the application module to the set of heterogeneous nodes.

The present disclosure generally describes some ubiquitous computing systems. Some example ubiquitous computing systems may be configured to include multiple nodes, an application including an application module, and a management unit. The management unit may be adapted to execute in a processor from a memory and, when executed by the processor, cause the management unit to deploy the application in the ubiquitous computing system by performing one or more of the following operations. The management unit may associate multiple nodes with node properties. The management unit may receive a command to deploy the application in the ubiquitous computing system. The management unit may identify eligible nodes from the multiple nodes, the eligible nodes capable of executing the application module by utilizing the node properties of the eligible nodes and having greater diversity over other sets of nodes in the ubiquitous computing system. The management unit may determine diversity fitness scores for groups of the eligible nodes. The diversity fitness scores may indicate a level of diversity between the eligible nodes in each of the groups. The management unit may identify a set of heterogeneous nodes corresponding to one of the groups having a highest diversity fitness score from the diversity fitness scores. The management unit may deploy the application module to the set of heterogeneous nodes.

The present disclosure generally describes some ubiquitous computing systems. Some example ubiquitous computing systems may be configured to include multiple nodes, an application including a first application module and a second application module, and a management unit. The management unit may be adapted to execute in a processor from a memory and, when executed by the processor, cause the management unit to deploy the application in the ubiquitous computing system by performing one or more of the following operations. The management unit may query the multiple nodes for node properties. When the management unit queries the multiple nodes for node properties, the management unit may receive the node properties from the multiple nodes. The management unit may generate a diversity table that associates the multiple nodes with the node properties. The management unit may receive a command to deploy the application in the ubiquitous computing system.

The management unit may identify first eligible nodes from the multiple nodes. The first eligible nodes may be capable of executing the first application module by utilizing the node properties of the first eligible nodes. The management unit may determine first diversity fitness scores for first groups of the first eligible nodes. The management unit may identify a first set of heterogeneous nodes corresponding to one of the first groups having a highest fitness score from the first diversity fitness scores. The management unit may deploy the first application module to the first set of heterogeneous nodes. The management unit may identify second eligible nodes from the multiple nodes. The second eligible nodes may be capable of executing the second application module by utilizing the node properties of the second eligible nodes. The management unit may determine second diversity fitness scores for second groups of the second eligible nodes. The management unit may identify a second set of heterogeneous nodes corresponding to one of the second groups having a highest fitness score from the second diversity fitness scores. The management unit may deploy the second application module to the second set of heterogeneous nodes.

The present disclosure generally describes some methods for modifying deployment of an application in a ubiquitous computing system. Some example methods may include deploying an application module of the application to a first node in the ubiquitous computing system. The methods may also include receiving a fault indicator from the first node during execution of the application module by the first node. The methods may further include transferring the application module from the first node to a second node in the ubiquitous computing system, in response to receiving the fault indicator from the first node during execution of the application module by the first node.

The present disclosure generally describes some ubiquitous computing systems. Some example ubiquitous computing systems may be configured to include multiple nodes, an application including an application module, and a management unit. The multiple nodes may include a first node and a second node. The management unit may be adapted to execute in a processor from a memory and, when executed by the processor, cause the management unit to deploy the application module to the first node. The management unit may receive a fault indicator from the first node during execution of the application module by the first node. The fault indicator may indicate a likelihood that the first node experiences a fault. The management unit may transfer the application module from the first node to the second node, in response to receiving the fault indicator from the first node during execution of the application module by the first node.

The present disclosure generally describes some ubiquitous computing systems. Some example ubiquitous computing systems may be configured to include multiple nodes, an application including an application module, and a management unit. The multiple nodes may include a first node and a second node. The management unit may be adapted to execute in a processor from a memory and, when executed by the processor, cause the management unit to deploy the application module to the first node according to an original deployment strategy. The management unit may receive a fault indicator from the first node during execution of the application module by the first node. The fault indicator may indicate a likelihood that the first wide experiences a fault. The management unit may modify the original deployment strategy based on the fault indicator to generate a modified deployment strategy, in response to receiving the fault indicator from the first node during execution of the application module by the first node. The management unit may redeploy the application module to the second node according to the modified deployment strategy.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 is a diagram illustrating an example diversity table;

DETAILED DESCRIPTION

Figure 1:
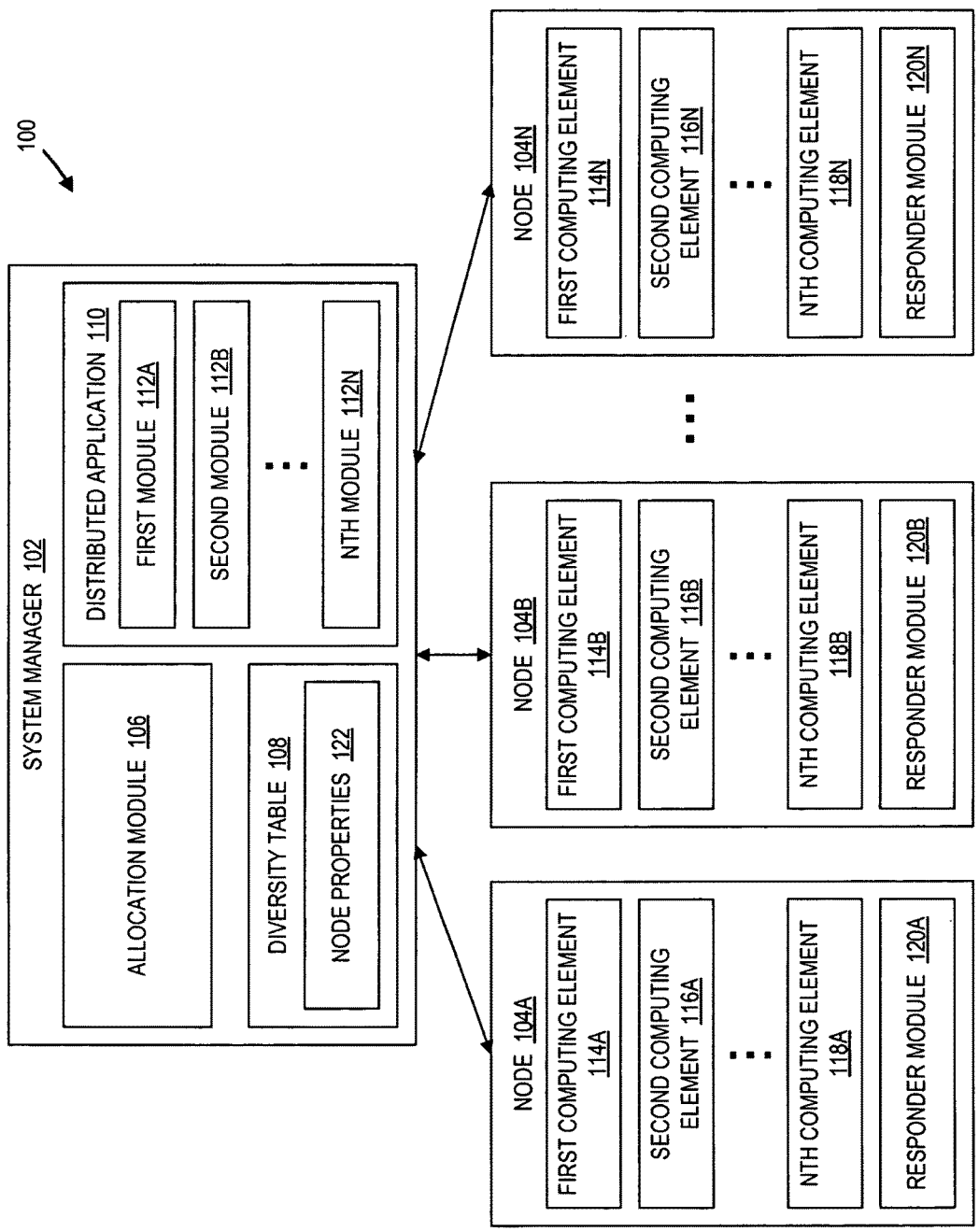
FIG. 1 is a functional block diagram illustrating an example ubicomp network adapted to allocate tasks in a distributed application to two or more heterogeneous nodes.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to a diversity table adapted to map multiple nodes to various node properties, which specify functional capabilities of the nodes and other relevant information about the nodes. The multiple nodes may be a diverse set of computing devices within a ubiquitous computing ("ubicomp") network. The computing devices may be diverse according to various computing elements, including different hardware, software, firmware, and/or other suitable elements. A task allocation module may be configured to allocate tasks of a distributed application to two or more nodes having greater diversity according to the diversity table. By allocating the tasks to diverse nodes, the task allocation module can ensure reliability of the ubicomp network even when certain types of computing elements experience faults when executing the tasks.

For each task in the distributed application, the task allocation module may identify eligible nodes that are capable of executing the task. The task allocation module may then determine a diversity fitness score, which indicates a level of diversity between groups of two or more eligible nodes. For example, eligible nodes may include nodes A, B, and C. A first diversity fitness score may indicate a first level of diversity between nodes A and B. A second diversity fitness score may indicate a second level of diversity between nodes B and C. A third diversity fitness score may indicate a third level of diversity between nodes A and C. In this example, the task allocation module may allocate the tasks to the pair of nodes having the highest diversity fitness score.

This disclosure is generally further drawn, inter alia, to processes adapted to modify deployment of application modules in a distributed application based on fault prediction. A deployment module may be configured to deploy the application modules to multiple nodes in a ubicomp network. A deployment optimization module may be configured to receive fault indicators from the multiple nodes. Each of the fault indicators may indicate a likelihood that a respective node in the multiple nodes experiences a particular fault. The deployment optimization module may recommend deployment changes to the deployment module based on the fault indicators. The deployment module may redeploy the application modules to different nodes based on the recommended deployment changes.

Turning now to FIG. 1, a functional block diagram illustrates an example ubicomp network 100 adapted to allocate tasks in a distributed application to two or more heterogeneous nodes, in accordance with at least some embodiments presented herein. The ubicomp network 100 may include a system manager 102 and nodes 104A, 104B, 104N. The nodes 104A-104N may be collectively referred to as nodes 104. The system manager 102 may include an allocation module 106, a diversity table 108, and a distributed application 110. The distributed application 110 may include a first module 112A, a second module 112B, and an Nth module 112N. The modules 112A-112N may be collectively referred to as modules 112. The modules 112 may represent executable portions of the distributed application 110.

The nodes 104 may be various computing devices, which include first computing elements 114A, 114B, 114N, second computing elements 116A, 116B, 116N, and Nth computing elements 118A, 118B, 118N. The first computing elements 114A-114N may be collectively referred to as first computing elements 114. The second computing elements 116A-116N may be collectively referred to as second computing elements 116. The third computing elements 118A-118N may be collectively referred to as third computing elements 118. The nodes 104 may further include responder modules 120A, 120B, 120N. The responder modules 120A-120N may be collectively referred to as responder modules 120.

The allocation module 106 may be configured to query the nodes 104 for node properties 122 regarding the computing elements 114, 116, 118. The computing elements 114, 116, 118 may be various hardware, software, firmware, and/or other suitable elements contained within the nodes 104. The allocation module 106 may send an instruction requesting the node properties 122 to the responder modules 120. An example of such an instruction may be the "uname" command in UNIX and UNIX-like operating systems. The node properties 122 may define functional capabilities of any hardware, software, firmware, and/or other suitable elements contained within the nodes 104. The node properties 122 may also define network related information regarding a communications network coupled to the nodes 104. Some examples of the node properties 122 may include hardware type, hardware version, software type, software version, available memory, bit width, rate of memory change over time, number of cores, cache size, network bandwidth, network connectivity, or the like. The responder modules 120 may be configured to respond to the query by providing the requested node properties 122 to the allocation module 106.

Upon receiving the node properties 122, the allocation module 106 may be configured to generate the diversity table 108. In some embodiments, the diversity table 108 may include multiple rows representing the nodes 104 and multiple columns representing categories of the node properties 122. In an example of such an arrangement, a first row may correspond to the node 104A, a second row may correspond to the node 104B, and an Nth row may correspond to the node 104N. Further, a first column may correspond to a first category of the node properties 122, a second column may correspond to a second category of the node properties 122, and an Nth column may correspond to an Nth category of the node properties 122. In some other embodiments, the diversity table 108 may be configured to organize the node properties 122 in other suitable arrangements. Additional details regarding the diversity table 108 are provided below with reference to FIG. 2.

The node properties 122 corresponding to each of the nodes 104 and each of the categories of the node properties 122 may be represented as values in the diversity table 108. Such values may be represented as binary and/or non-binary values. As described in greater detail below, the allocation module 106 may be configured to compare the values in the diversity table 108 in order to determine diversity scores for groups of two or more nodes. In order to effectuate such comparisons, the allocation module 106 may be configured to convert the node properties received from the responder modules 120 to a standardized format (e.g., a standard unit) prior to or after writing the node properties to the diversity table 108.

The allocation module 106 may be configured to receive an instruction to deploy the distributed application 110. Such an instruction may be submitted by a user. For example, the user may click on an icon to deploy the distributed application 110 through a graphical user interface. Such an instruction may also be submitted by another application or a system command. Upon receiving the instruction to deploy the distributed application 110, the allocation module 106 may be configured to determine, for each of the modules 112, eligible nodes of the nodes 104 that are capable of executing the module based on the diversity table 108. Each of the modules 112 may contain program code that can be executed only by nodes having certain functional capabilities. That is, each of the modules 112 may require or utilize a particular runtime environment for proper and/or optimized execution of the module. The particular runtime environment may include particular hardware, software, firmware, and/or other suitable elements (e.g., a particular operating system or virtual machine, a certain amount of memory, a certain processor speed, etc.). In this case, the eligible nodes may refer to at least a subset of the nodes 104 having those functional capabilities, as defined by the diversity table 108, matching the particular runtime environment.

Upon determining the eligible nodes, the allocation module 106 may be configured to determine a diversity fitness score for multiple groups of the eligible nodes. Each group may include two or more eligible nodes. For example, eligible nodes may include nodes 104A, 104B, 104N. In this example, a first group of nodes may include nodes 104A, 104B. A second group of nodes may include nodes 104B, 104N. A third group of nodes may include nodes 104A, 104N.

The diversity fitness score may indicate a level of diversity between the eligible nodes in a group of nodes. For example, a first diversity score of the first group of nodes may be higher than a second diversity score of the second group of nodes. The second diversity score may be higher than a third diversity score of the third group of nodes. In this example, the first group of nodes may be considered more diverse than the second group nodes, and the second group nodes may be considered more diverse than the third group of nodes. In some embodiments, the diversity fitness score may increase with greater diversity of functional capabilities and decrease with lesser diversity of functional capabilities. Additional details for computing the diversity fitness score are described below with reference to FIG. 2.

Upon generating the diversity fitness scores for the multiple collections of eligible nodes, the allocation module 106 may be configured to deploy each of the modules 112 according to a suitable deployment strategy. The deployment strategy may utilize the diversity fitness scores. In some embodiments, the deployment strategy may involve deploying a module to eligible nodes having the highest diversity fitness score and having at least one matching computing element. Such a deployment strategy where a module is deployed to diverse nodes having at least one matching element may provide redundancy of the matching computing element. In some other embodiments, the deployment strategy may involve deploying a module to eligible nodes having the highest diversity fitness scores and having different computing elements with overlapping functionality. In this case, if a first computing element fails, then a second computing element that does not fail may provide the same functionality as the first computing element.

In some embodiments, the allocation module 106 may be configured to incorporate the diversity fitness scores with other suitable fitness scores. Some examples of other fitness scores may include performance fitness scores that indicate a level of performance of the eligible nodes or power usage fitness scores that indicate a level of power usage of the eligible nodes. In these examples, the allocation module 106 may adjust the diversity fitness scores depending on the performance fitness scores or the power usage fitness scores. Alternatively or additionally, the allocation module 106 may also determine an overall score based on the diversity fitness scores, the performance fitness scores, or the power usage fitness scores.

Turning now to FIG. 2, a diagram illustrates an example diversity table 108, in accordance with at least some embodiments presented herein. The diversity table 108 may include a first row 202A, a second row 202B, a third row 202C, a fourth row 202D, a fifth row 202E, and a sixth row 202F. The rows 202A-202F may be collectively referred to as rows 202. The diversity table 108 may further include a first column 204A, a second column 204B, a third column 204C, a fourth column 204D, and a fifth column 204E. The columns 204A-204E may be collectively referred to as columns 204. The diversity table 108 may also include multiple values, each of which corresponds to one of the rows 202 and one of the columns 204. Six rows and six columns are shown in the example diversity table 108 for simplicity and one skilled in the art will appreciate that a diversity table may include a different number of rows and/or columns.

The rows 202 may correspond to various nodes, such as the nodes 104. The first row 202A, the second row 202B, the third row 202C, the fourth row 202D, the fifth row 202E, and the sixth row 202F may corresponding to nodes A, B, C, D, E, and F, respectively. The columns 204 may correspond to categories of node properties, such as the node properties 122. The first column 204A may correspond to an operating system type. The second column 204B may correspond to available memory. The third column 204C may correspond to memory rate of change (i.e., a rate at which memory is used or freed over a given time interval). The fourth column 204D may correspond to a hardware identifier ("ID") that identifies hardware by type, version, chipset, etc. The fifth column 204E may correspond to a virtual machine ID that identifies a virtual machine.

Diversity fitness scores may be determined by comparing the values in the diversity table 108. In an illustrative example, a distributed application, such as the distributed application 110, may include a first module and a second module. The first module may operate on any of the nodes A, B, C, D, E. The second module may operate only on operating system 1, which is executed on nodes A, C, and D. Comparisons between values under the first column 204A, the second column 204B, and the third column 204C may yield a single Boolean value (e.g., 1 for a match and 0 otherwise). Comparisons between values under the fourth column 204D and the fifth column 204E may yield a per-digit Boolean value.

In this example, comparisons may be made based on groups of two nodes. Regarding the first module, a group containing nodes B and C yields the highest diversity fitness score. In comparing nodes B and C, the values under the first column 204A, the second column 204B, and the third column 204C are different, thereby yielding a +3 score. The values under the fourth column 204D and the fifth column 204E have six different digits, thereby yielding a +6 score and a +9 total score. As a result, the group containing nodes B and C offers greater diversity than other groups of eligible nodes. For example, in comparing nodes A and B, the values under the first column 204A and the second column 204B are different, thereby yielding a +2 score. The values under the fourth column 204D and the fifth column 204E have four different digits, thereby yielding a +4 score and a +6 total score.

Regarding the second module, groups containing nodes A and C and nodes C and D yield the highest diversity fitness score. In comparing nodes A and C, the values under the second column 204B and the third column 204C are different, thereby yielding a +2 score. The values under the fourth column 204D and the fifth column 204E have three different digits, thereby yielding +3 score and a +5 total score. In comparing nodes C and D, the values under the second column 204B and the third column 204C are different, thereby yielding a +2 score. The values under the fourth column 204D and the fifth column 204E have three different digits, thereby yielding +3 score and a +5 total score. As a result, the groups containing nodes A and C and nodes C and D offer greater diversity than other groups of eligible nodes. For example, nodes A and D yield only a +1 score from having different available memory. It should be appreciated that the above groups are merely examples, and other groups can be made depending on the particular analysis of the scores. For example, some scores may be weighted over others.

Figure 3:
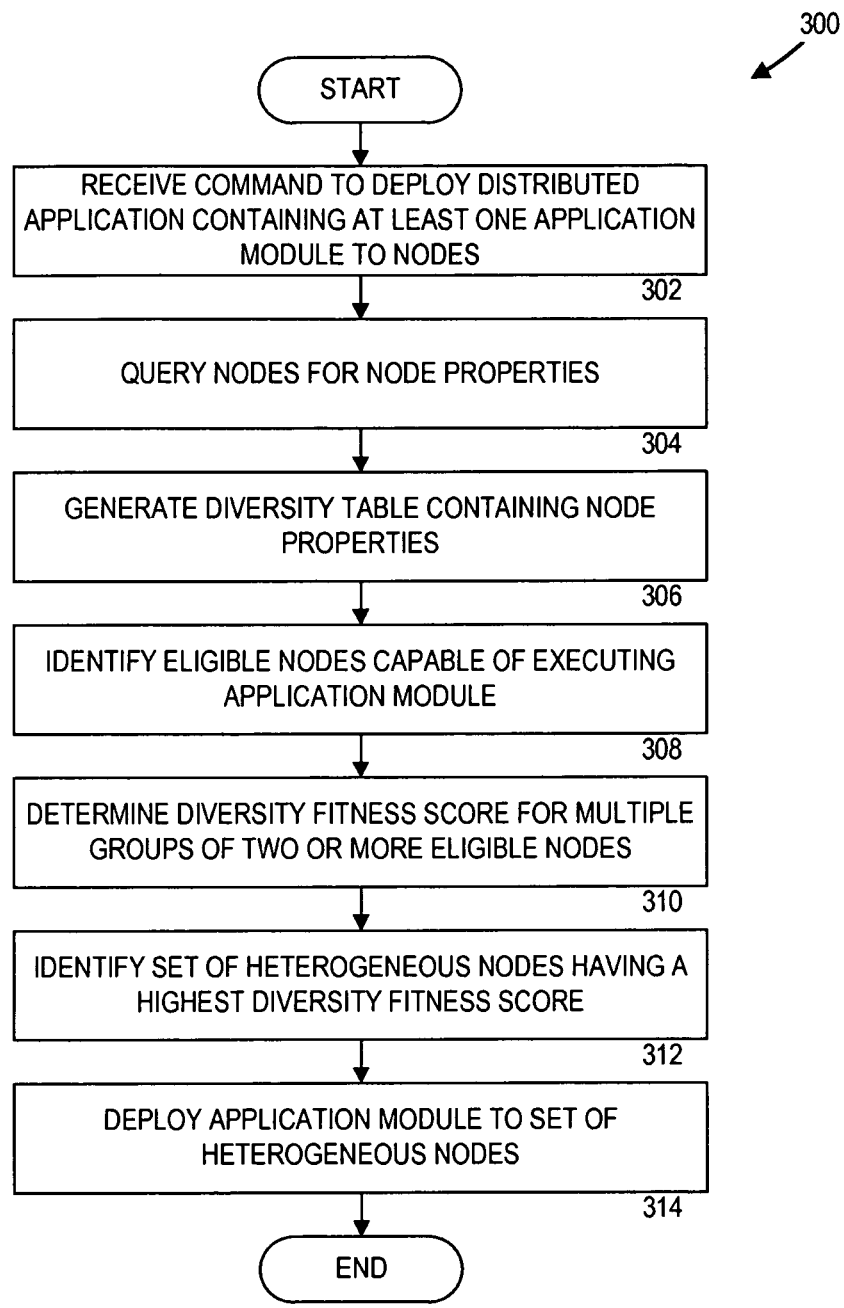
FIG. 3 is a flow diagram illustrating an example process for allocating tasks in a distributed application to two or more heterogeneous nodes.

Turning now to FIG. 3, a flow diagram illustrates an example process 300 for allocating tasks in a distributed application to two or more heterogeneous nodes, in accordance with at least some embodiments presented herein. The process 300 may include various operations, functions, or actions as illustrated by one or more of blocks 302-314. The process 300 may begin at block 302 (Receive Command to Deploy), where the allocation module 106 may be configured to receive a command to deploy the distributed application 110 to multiple eligible nodes in the ubicomp network 100. The eligible nodes may be selected from the nodes 104 in the ubicomp network 100. The command may be a user command received from a graphical user interface. The command may also be received from another application or a system command. Block 302 may be followed by block 304.

At block 304 (Query Nodes), the allocation module 106 may be configured to query the nodes 104 for node properties, which specify functional capabilities of the nodes 104 and other relevant information about the nodes 104. The query may include instructions requesting node properties from the nodes 104. Upon receiving the instructions, the responder modules 120 in the nodes 104 may provide the requested node properties to the allocation module 106. Block 304 may be followed by block 306.

At block 306 (Generate Diversity Table), the allocation module 106 may be configured to generate the diversity table 108 containing the node properties. The allocation module 106 may include multiple rows representing the nodes 104 and multiple columns representing categories of the node properties. The allocation module 106 may utilize the node properties to populate values corresponding to each of the rows and each of the columns in the diversity table 108. Other suitable arrangements of the diversity table 108 may be similarly implemented. Block 306 may be followed by block 308.

At block 308 (Identify Eligible Nodes), the allocation module 106 may be configured to identify eligible nodes that are capable of executing the application module. The eligible nodes may be selected from the nodes 104 based on information contained in the diversity table 108. The application module may require or utilize a particular runtime environment (e.g., particular hardware, software, firmware, and/or other suitable elements) for proper and/or optimized execution. The allocation module 106 may identify eligible nodes by selecting eligible nodes matching the particular runtime environment according to the diversity table 108. Block 308 may be followed by block 310.

At block 310 (Determine Diversity Fitness Scores), the allocation module 106 may be configured to determine diversity fitness scores for multiple groups of two or more eligible nodes. The diversity fitness scores may indicate a level of diversity between the eligible nodes in the groups. As such, the allocation module 106 can compare diversity fitness scores of multiple groups in order to identify more diverse and less diverse groups. Diversity may be defined by having different hardware, software, firmware, and/or other suitable elements. Greater diversity may be associated with having a higher number of diverse elements, while lesser diversity may be associated with having a lower number of diverse elements. Block 310 may be followed by block 312.

At block 312 (Identify Set of Heterogeneous Nodes), the allocation module 106 may be configured to identify a set of heterogeneous nodes corresponding to the group having the highest diversity fitness score. The heterogeneous nodes in the group having the highest diversity fitness score may have the highest level of diversity. As a result, when the allocation module 106 deploys the application module to the set of heterogeneous nodes, the heterogeneous nodes may provide greater diversity benefits (e.g., reliability) than other groups of eligible nodes. Block 312 may be followed by block 314.

At block 314 (Deploy Application Module), the allocation module 106 may be configured to deploy the application module to each eligible node in the set of heterogeneous nodes. The set of heterogeneous nodes may execute the application module, thereby providing diversity benefits by having diverse nodes executing the same application module. After block 314, the process 300 may either repeat (e.g., periodically, continuously, or on demand as needed) or terminate. For example, blocks 308-314 may be repeated for each application module in order to deploy multiple application modules within a particular distributed application, such as the distributed application 110.

Figure 4:
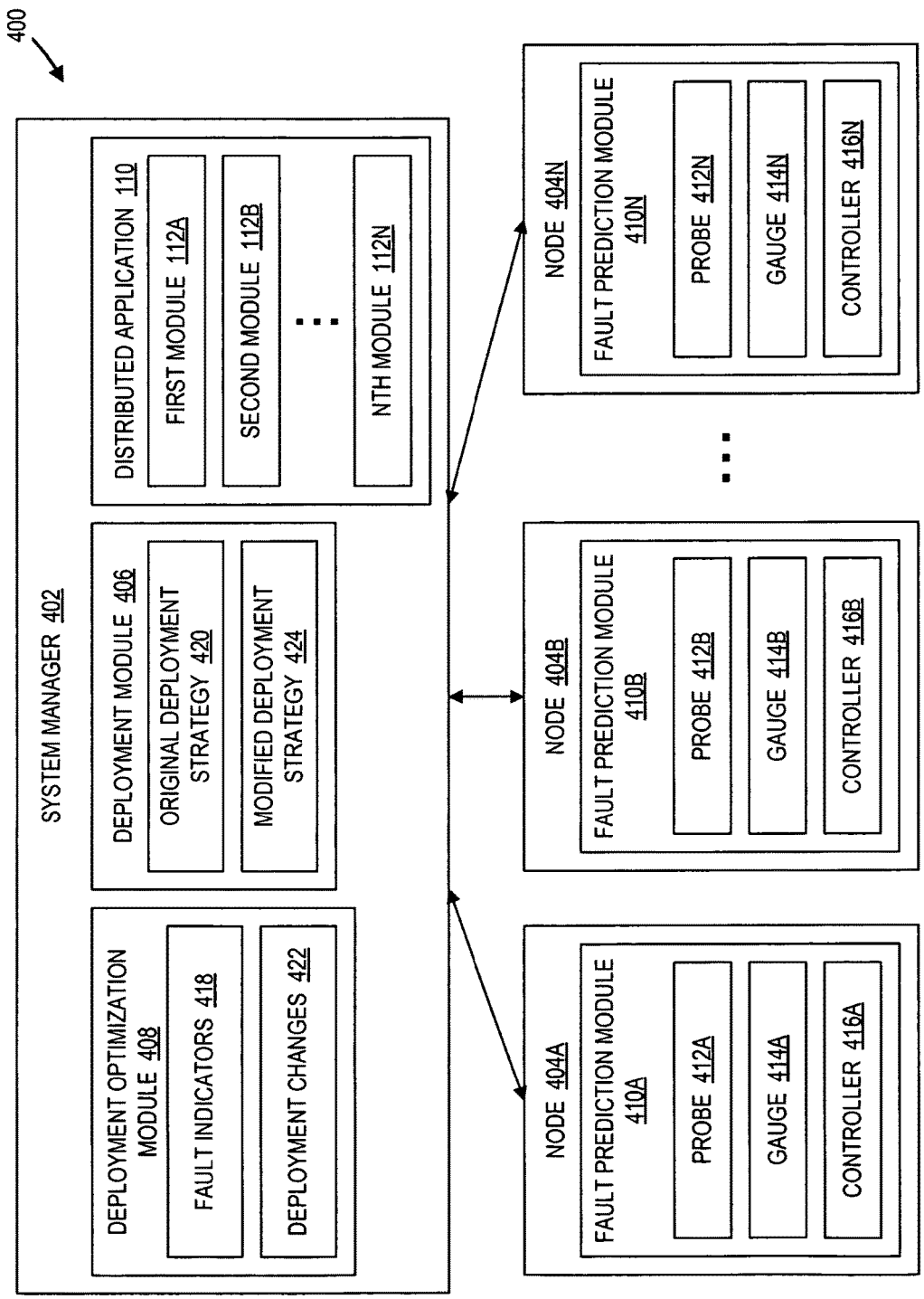
FIG. 4 is a functional block diagram illustrating an example ubicomp network adapted to modify deployment of application modules in a distributed application based on fault prediction.

Turning now to FIG. 4, a functional block diagram illustrates an example ubicomp network 400 adapted to modify deployment of application modules in a distributed application based on fault prediction, in accordance with at least some embodiments presented herein. The ubicomp network 400 may include a system manager 402 and nodes 404A, 404B, 404N. The nodes 404A-404N may be collectively referred to as nodes 404. The system manager 402 may include a deployment module 406, a deployment optimization module 408, and the distributed application 110. As previously described, the distributed application 110 may include the modules 112, and the modules 112 may represent executable portions of the distributed application 110.

The nodes 404 may each include fault prediction modules 410A, 410B, 410N. The fault prediction modules 410A-410N may be collectively referred to as fault prediction modules 410. In some embodiments, the fault prediction modules 410 may include one or more probes 412A, 412B, 412N, one or more gauges 414A-414N, and one or more controllers 416A-416N. The probes 412A-412N may be collectively referred to as probes 412. The gauges 414A-414N may be collectively referred to as gauges 414. The controllers 416A-416N may be collectively referred to as controllers 416. As described in greater detail below, the combination of probes 412, gauges 414, and controllers 416 may be configured to gather and analyze fault predictive data in order to determine fault indicators 418. Other suitable technologies adapted to gather and/or analyze fault predictive data and to determine the fault indicators 418 may be similarly implemented.

According to various embodiments, the deployment module 406 may be adapted to deploy each of the modules 112 to one or more of the nodes 404 according to an original deployment strategy 420. In some embodiments, the original deployment strategy 420 may be determined by the allocation module 106 based on information provided in the diversity table 108. In some other embodiments, the original deployment strategy 420 may be determined according to any suitable methodologies. In an illustrative implementation of the original deployment strategy 420, the first module 112A may be deployed to the node 404A, and the second module 112B may be deployed to the node 404B.

When the nodes 404A-404B receive and execute the modules 112A-112B, the fault prediction modules 410 may gather fault predictive data from the respective nodes 404A-404B while the nodes 404A-404B execute the modules 112A-112B. In some embodiments, the fault prediction modules 410 may also analyze the fault predictive data in order to determine the fault indicators 418. The fault prediction modules 410 can then provide the fault indicators 418 to the deployment optimization module 408. In some other embodiments, the deployment optimization module 408 may receive the fault predictive data from the fault prediction modules 410 and determine the fault indicators 418 based on the fault predictive data. The fault predictive data may include any suitable data related to the operation of the nodes 404A-404B when executing the modules 112A-112B. The fault indicators 418 may include estimated probabilities of various faults, such as memory overflows, race conditions, digital overflows, or the like.

Various examples for determining such estimated probabilities are described in the following publications, which are incorporated by reference herein in their entireties: (1) P. Inverardi et al., "Correct Deployment and Adaptation of Software Application on Heterogeneous (Mobile) Devices," Proceedings of the First Workshop on Self-Healing Systems (2002); (2) D. Ghosh et al., "Self-healing systems-survey and synthesis," Decision Support Systems 42, No. 4 (2007): 2164-2185; and (3) S. Ahmed et al., "ETS (Efficient, Transparent, and Secured) Self-healing Service for Pervasive Computing Applications," International Journal of Network Security 4, No. 3 (2007): 271-281. Inverardi et al. generally describes, inter alia, an approach for code that manifests properties that allow a supervisory process or manager to determine whether a given piece of code can run on a particular hardware, and provides information that can be used to identify shortcomings in hardware environments that may cause problems for a particular software module. Ghosh et al. generally describes, inter alia, a framework for detecting degraded states, detecting failures in software modules, and recovery by implementing repair packages Ahmed et al. generally describes, inter alia, device healing and also addresses various other technologies such as making repair packages and methods for storing and deploying the repair packages.

In some embodiments, the combination of probes 412A-412B, gauges 414A-414B, and controllers 416A-416B may be configured to gather and analyze fault predictive data in order to determine fault indicators 418. The probes 412A-412B may be configured to gather and report raw data from the nodes 404A-404B to the gauges 414A-414B. The probes 412A-412B may refer to individual sensors attached to or associated with the modules 112A-112B. In this case, the probes 412A-412B may be additional program code inserted into the modules 112A-112B for purposes of gathering and reporting the raw data generated when the nodes 404A-404B execute the modules 112A-112B. The raw data may include any suitable information regarding the activities and states of the nodes 404A-404B when executing the modules 112A-112B. Some examples of the probes 412A-412B may include loop counters that keep counts that particular loops in the modules 112A-112B are executed. Various examples probes, such as the probes 412, are described in G. Kaiser et al., "An Approach to Autonomizing Legacy Systems," in Workshop on Self-Healing, Adaptive and Self-Managed Systems (2002), which is incorporated by reference herein in its entirety. Kaiser et al. generally describes, inter alia, modification of legacy dynamic linked libraries ("DLL") to add useful probe functions that report variables of importance for predicting faults. Thus, when legacy software reaches out to use the DLLs, the legacy software can utilize the modified DLLS that incorporate useful fault prediction reporting.

The gauges 414A-414B may be configured to interpret the raw data and map the raw data to various data models and provide the interpreted data to the controllers 416A-416B. The gauges 414A-414B may refer to software entities that gather, filter, compute, and/or analyze the raw data against the data models in order to generate events that interpret the raw data at a higher level of abstraction. The data models may include various conditions and action rules. When the raw data satisfies the conditions and action rules, the raw data may trigger certain events. The gauges 414A-414B may provide streams of such events to the controllers 416A-416B. Some examples of the gauges 414A-414B may combine and synthesize multiple loop counters in the probes 412A-412B in order to generate loop-related events.

The controllers 416A-416B may be configured to determine and analyze implications of the interpreted data in order to determine the fault indicators 418. The controllers 416A-416B may analyze the event streams for various patterns and thresholds of events that are associated with the fault indicators 418. The controllers 416A-416B may also analyze the event streams with respect to other data that is not gathered by the probes 412A-412B (e.g., data retrieved by querying operating systems executing on the nodes 404). These patterns and thresholds may be adapted to predict certain faults based on historical and other suitable data. The fault indicators 418 may each be associated with a percentage that indicates the likelihood that a particular fault will likely occur. Multiple percentages of various faults may be combined in order to determine an overall likelihood of failure. The controllers 416A-416B may provide the fault indicators 418 to the deployment optimization module 408. In some other embodiments, the deployment optimization module 408 may receive the fault predictive data from the fault prediction modules 410 and determine the fault indicators 418 based on the fault predictive data.

The deployment optimization module 408 may recommend deployment changes 422 to the deployment module 406 based on the fault indicators 418. Continuing the previously described illustrative implementation of the original deployment strategy 420, the node 404A may execute the first module 112A, and the node 404B may execute the second module 112B. In this example, the second module 112B may be a video decompression software module. The original deployment strategy 420 may have originally specified that the node 404B execute the video decompression software module because the node 404B had greater capability of performing video decompression than the node 404N. The fault indicators 418 may indicate a high risk of failure of the node 404B when executing the video decompression software module due to a low memory condition (e.g., an undesirable rate of memory change, a congested video buffer, etc.) on the node 404B. In this case, the deployment optimization module 408 may recommend the deployment changes 422 to the deployment module 406 whereby the video decompression software module is removed from the node 404B. The deployment changes 422 may suggest deploying the video decompression software to the node 404N, which does not experience the low memory condition.

Upon receiving the recommended deployment changes 422 from deployment optimization module 408, the deployment module 406 may effectively transfer the video decompression software module from the node 404B to the node 404N. In some embodiments, the deployment module 406 may adjust the original deployment strategy 420 in order to generate a modified deployment strategy 424 based on the recommended deployment changes 422. The deployment module 406 can then redeploy the modules 112 according to the modified deployment strategy 424. In some other embodiments, the deployment module 406 may adjust the diversity table 108 to account for the fault indicators 418. For example, the diversity table 108 may further include fault data that specifies probabilities of failure of certain nodes when executing certain modules. In this way, the allocation module 106 can avoid or minimize deploying modules to certain nodes that have higher probabilities of failure. The deployment module 406, the deployment optimization module 408, and the fault prediction module 410 may continuously operate in order to dynamically modify the deployment of the modules 112 in the distributed application 110.

Figure 5:
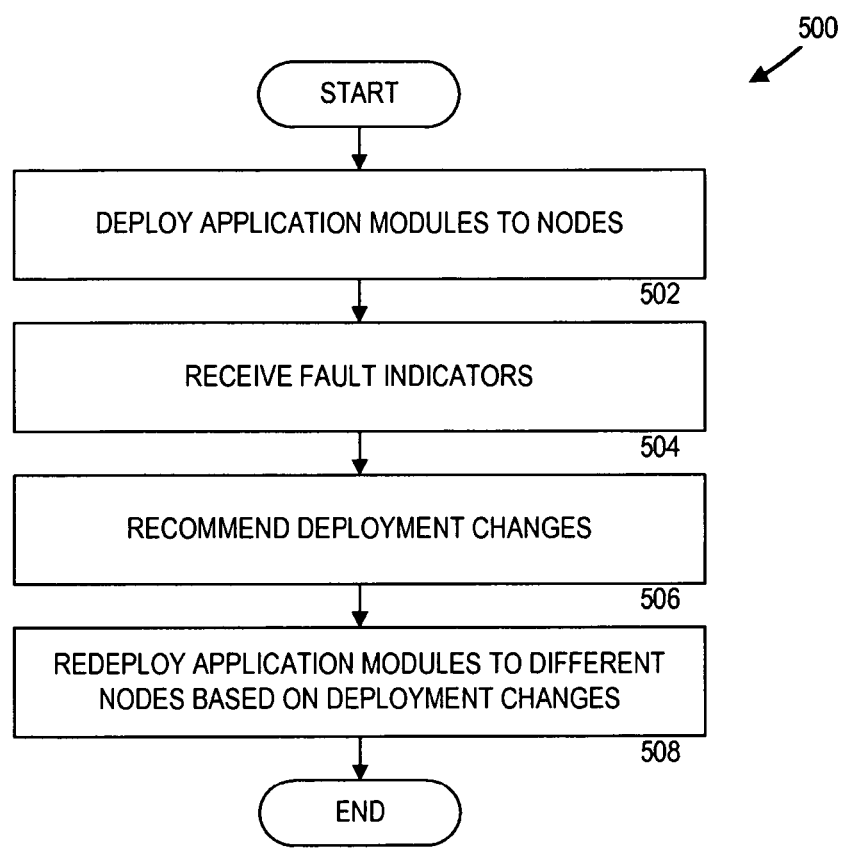
FIG. 5 is a flow diagram illustrating an example process for modifying deployment of application modules in a distributed application based on fault prediction.

Turning now to FIG. 5, a flow diagram illustrates an example process 500 for modifying deployment of application modules in a distributed application based on fault prediction, in accordance with at least some embodiments presented herein. The process 500 may include various operations, functions, or actions as illustrated by one or more of blocks 502-508. The process 500 may begin at block 502 (Deploy Application Modules), where the deployment module 406 may be configured to deploy the modules 112 to the nodes 404 according to the original deployment strategy 420. The nodes 404 can then execute their respective modules 112. Block 502 may be followed by block 504.

At block 504 (Receive Fault Indicators), the deployment optimization module 408 may be configured to receive the fault indicators 418. In some embodiments, the fault prediction modules 410 may gather and analyze fault predictive data in order to determine the fault indicators 418. The fault prediction modules 410 can then provide the fault indicators 418 to the deployment optimization module 408. In some other embodiments, the fault prediction modules 410 may gather the fault predictive data and provide the fault predictive data to the deployment optimization module 408. The deployment optimization module 408 can then determine the fault indicators 418 based on the fault predictive data. Block 504 may be followed by block 506.

At block 506 (Recommend Deployment Changes), the deployment optimization module 408 may be configured to recommend the deployment changes 422 based on the fault indicators 418 to the deployment module 406. The deployment changes 422 may be adapted to effectively transfer at least some of the modules 112 to different nodes 404 in order to avoid or minimize faults specified by the fault indicators 418. Block 506 may be followed by block 508.

At block 508 (Redeploy Application Modules), the deployment module 406 may be configured to effectively transfer at least some of the modules 112 to one or more different nodes 404 in accordance the recommended deployment changes 422. In some embodiments, the deployment module 406 may adjust the original deployment strategy 420 in order to generate a modified deployment strategy 424 based on the recommended deployment changes 422. The deployment module 406 can then redeploy the modules 112 according to the modified deployment strategy 424. In some other embodiments, the deployment module 406 may adjust the diversity table 108 to account for the fault indicators 418. In some embodiments, the functionality of the deployment module 406 and the deployment optimization module 408 may be combined. After block 508, the process 500 may either repeat (e.g., periodically, continuously, or on demand as needed) or terminate.

Figure 6:
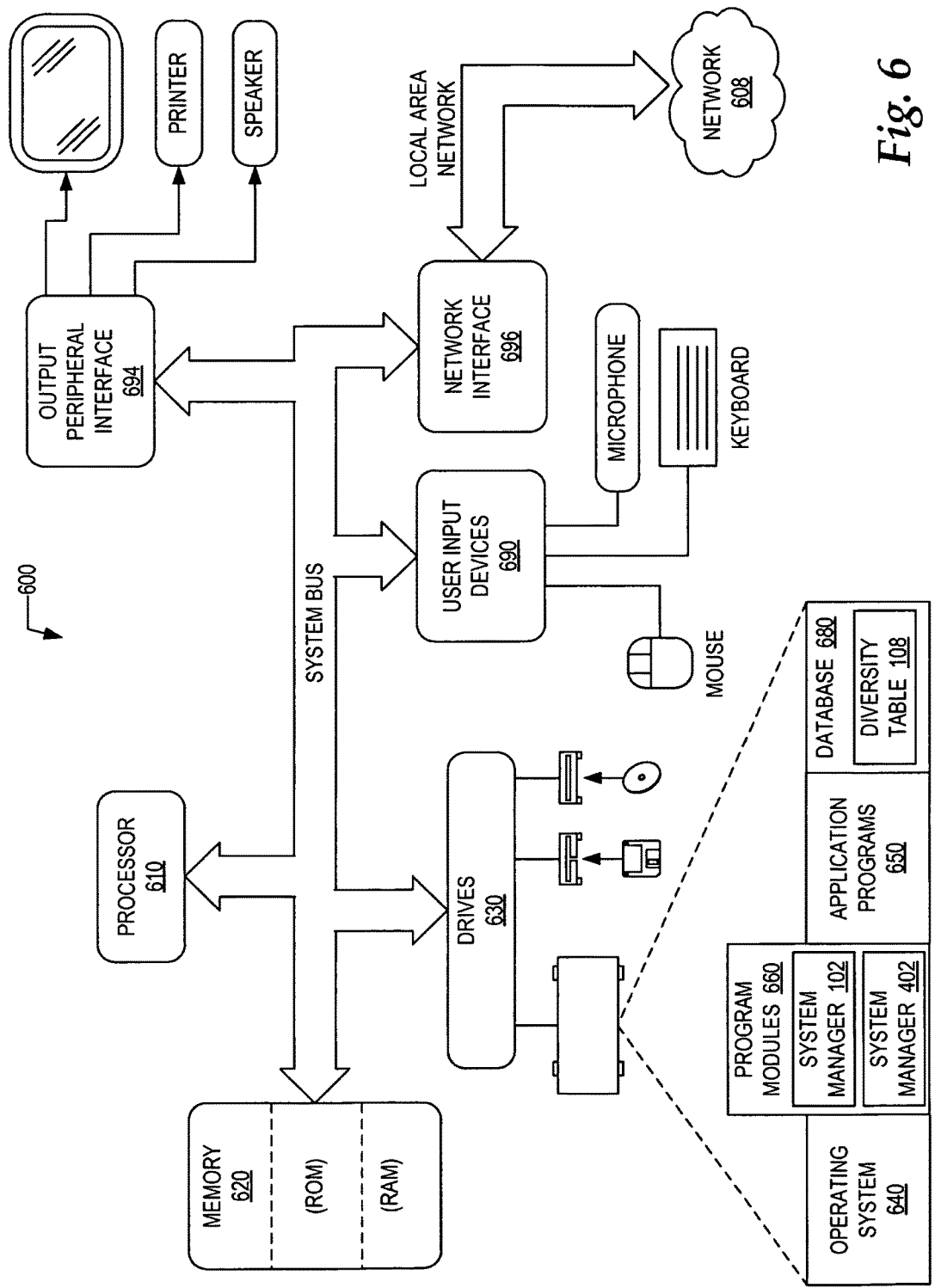
FIG. 6 is a block diagram illustrating an example computing system.

FIG. 6 is a computer architecture diagram showing an illustrative computer hardware architecture for an example computing system capable of implementing at least some embodiments presented herein. FIG. 6 includes a computer 600, including a processor 610, memory 620 and one or more drives 630. The computer 600 may be implemented as a conventional computer system, an embedded control computer, a laptop, or a server computer, a mobile device, a set-top box, a kiosk, a vehicular information system, a mobile telephone, a customized machine, or other hardware platform.

The drives 630 and their associated computer storage media, provide storage of computer readable instructions, data structures, program modules and other data for the computer 600. The drives 630 can include an operating system 640, application programs 650, program modules 660, and a database 680. The program modules 660 may include the system manager 102 and/or the system manager 402. The system manager 102 may be adapted to execute the process 300 for allocating tasks in a distributed application to two or more heterogeneous nodes, as described in greater detail above with reference to FIG. 3. The system manager 402 may be adapted to execute the process 500 for modifying deployment of application modules in a distributed application based on fault prediction, as described in greater detail above with reference to FIG. 5. The database 680 may store the diversity table 108. The computer 600 further includes user input devices 690 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 610 through a user input interface that is coupled to a system bus, but may be coupled by other interface and bus structures, such as a parallel port, game port or a universal serial bus ("USB"). Computers such as the computer 600 may also include other peripheral output devices such as speakers, which may be coupled through an output peripheral interface 694 or the like.

The computer 600 may operate in a networked environment using logical connections to one or more computers, such as a remote computer coupled to a network interface 696. The remote computer may be a personal computer, a server, a router, a network PC, a peer device or other common network node, and can include many or all of the elements described above relative to the computer 600. Networking environments are commonplace in offices, enterprise-wide area networks ("WAN"), local area networks ("LAN"), intranets, and the Internet.

When used in a LAN or WLAN networking environment, the computer 600 may be coupled to the LAN through the network interface 696 or an adapter. When used in a WAN networking environment, the computer 600 typically includes a modem or other means for establishing communications over the WAN, such as the Internet or the network 608. The WAN may include the Internet, the illustrated network 608, various other networks, or any combination thereof. It will be appreciated that other mechanisms of establishing a communications link, ring, mesh, bus, cloud, or network between the computers may be used.

According to some embodiments, the computer 600 may be coupled to a networking environment. The computer 600 may include one or more instances of a physical computer-readable storage medium or media associated with the drives 630 or other storage devices. The system bus may enable the processor 610 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 620, whether characterized as RAM, ROM, flash, or other types of volatile or non-volatile memory technology. The media may also represent secondary storage, whether implemented as the storage drives 630 or otherwise. Hard drive implementations may be characterized as solid state, or may include rotating media storing magnetically-encoded information.

The storage media may include one or more program modules 660. The program modules 660 may include software instructions that, when loaded into the processor 610 and executed, transform a general-purpose computing system into a special-purpose computing system. As detailed throughout this description, the program modules 660 may provide various tools or techniques by which the computer 600 may participate within the overall systems or operating environments using the components, logic flows, and/or data structures discussed herein.

The processor 610 may be constructed from any number of transistors or other circuit elements, which may individually or collectively assume any number of states. More specifically, the processor 610 may operate as a state machine or finite-state machine. Such a machine may be transformed to a second machine, or specific machine by loading executable instructions contained within the program modules 660. These computer-executable instructions may transform the processor 610 by specifying how the processor 610 transitions between states, thereby transforming the transistors or other circuit elements constituting the processor 610 from a first machine to a second machine. The states of either machine may also be transformed by receiving input from the one or more user input devices 690, the network interface 696, other peripherals, other interfaces, or one or more users or other actors. Either machine may also transform states, or various physical characteristics of various output devices such as printers, speakers, video displays, or otherwise.

Encoding the program modules 660 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 660 may transform the physical state of the semiconductor memory 620 when the software is encoded therein. For example, the software may transform the state of transistors, capacitors, or other discrete circuit elements constituting the semiconductor memory 620.

As another example, the storage media may be implemented using magnetic or optical technology such as drives 630. In such implementations, the program modules 660 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 7:
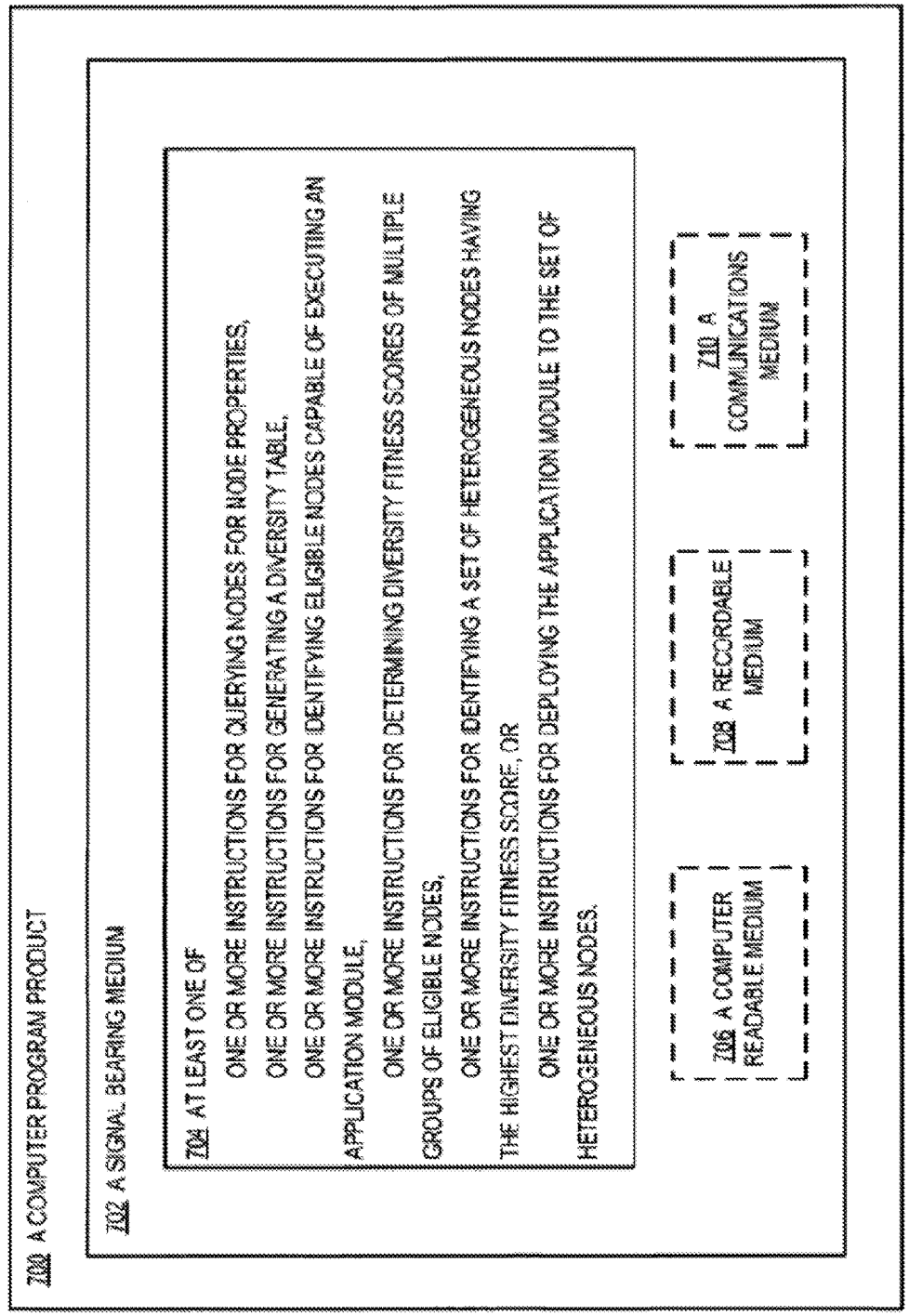
FIGS. 7 and 8 are schematic diagrams illustrating computer program products, all arranged according to at least some embodiments presented.

Turning now to FIG. 7, a schematic diagram that illustrates a partial view of a computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for querying nodes for node properties; one or more instructions for generating a diversity table; one or more instructions for identifying eligible nodes capable of executing an application module; one or more instructions for determining diversity fitness scores of multiple groups of eligible nodes; one or more instructions for identifying a set of heterogeneous nodes having the highest diversity score; or one or more instructions for deploying the application module to the set of heterogeneous nodes. In some embodiments, the signal bearing medium 702 of the one or more computer program products 700 include a computer readable medium 706, a recordable medium 708, and/or a communications medium 710.

Figure 8:
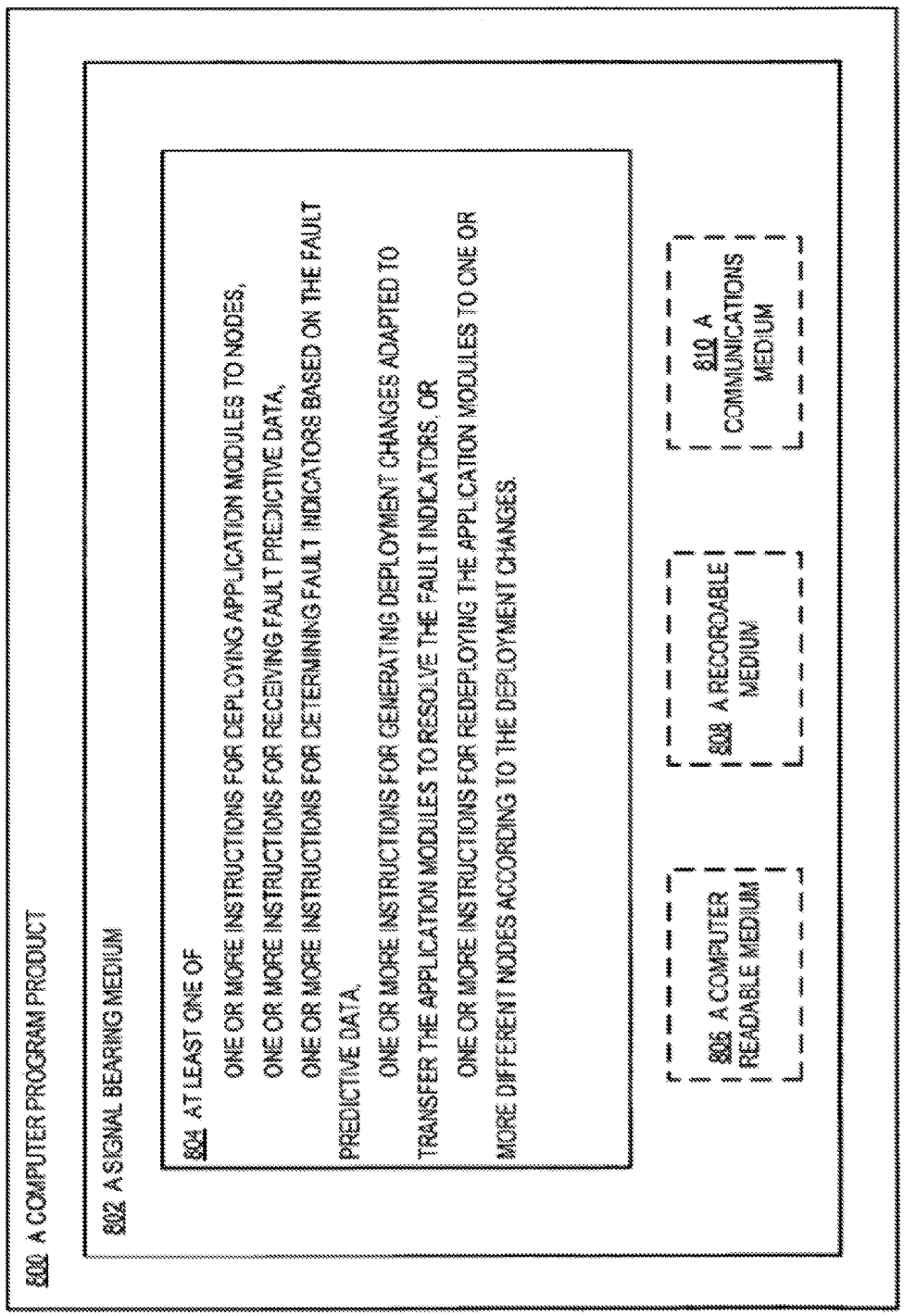

Turning now to FIG. 8, a schematic diagram that illustrates a partial view of a computer program product 800 that includes a computer program for executing a computer process on a computing device, arranged according to at least some embodiments presented herein. An illustrative embodiment of the example computer program product is provided using a signal bearing medium 802, and may include at least one instruction of 804: one or more instructions for deploying application modules to nodes; one or more instructions for receiving fault predictive data; one or more instructions for determining fault indicators based on the fault predictive data; one or more instructions for generating deployment changes adapted to transfer the application modules to resolve the fault indicators; or one or more instructions for redeploying the application modules to one or more different nodes according to the deployment changes. In some embodiments, the signal bearing medium 802 of the one or more computer program products 800 include a computer readable medium 806, a recordable medium 808, and/or a communications medium 810.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to deploy an application in a computing system, comprising:

receiving, by a processor, a command to deploy the application in the computing system, the application comprising an application module;

identifying, by the processor, a first set of heterogeneous nodes and a second set of heterogeneous nodes in the computing system, each capable of executing the application module;

identifying, by the processor, a node property of the first set of heterogeneous nodes and the second set of heterogeneous nodes, wherein the node property relates to functional capabilities of the first set of heterogeneous nodes and the second set of heterogeneous nodes respectively;

identifying, by the processor, a first value of the node property for a first node of the first set of heterogeneous nodes;

identifying, by the processor, a second value of the node property for a second node of the first set of heterogeneous nodes;

comparing, by the processor, the first value and the second value to determine a first diversity fitness score for the first set of heterogeneous nodes, wherein the first diversity fitness score represents a difference between the first value and the second value;

determining a first fault indicator related to operation of the first set of heterogeneous nodes, wherein the first fault indicator includes estimated probabilities of faults for the first set of heterogeneous nodes;

adjusting the first diversity fitness score based on the first fault indicator to produce a first adjusted diversity fitness score;

identifying, by the processor, a third value of the node property for a third node of the second set of heterogeneous nodes;

identifying, by the processor, a fourth value of the node property for a fourth node of the second set of heterogeneous nodes;

comparing, by the processor, the third value and the fourth value to determine a second diversity fitness score for the second set of heterogeneous nodes, wherein the second diversity fitness score represents a difference between the third value and the fourth value;

determining a second fault indicator related the operation of the second set of heterogeneous nodes, wherein the second fault indicator includes estimated probabilities of faults for the second set of heterogeneous nodes;

adjusting the second diversity fitness score based on the second fault indicator to produce a second adjusted diversity fitness score;

comparing, by the processor, the first adjusted diversity fitness score for the first set of heterogeneous nodes to the second adjusted diversity fitness score for the second set of heterogeneous nodes in the computing system;

determining, by the processor, that the first adjusted diversity fitness score is a greatest diversity fitness score among the first adjusted diversity fitness score and the second adjusted diversity fitness score based on the comparison of the first adjusted diversity fitness score with the second adjusted diversity fitness score;

selecting, by the processor, the first set of heterogeneous nodes in response to the first adjusted diversity score being the greatest diversity fitness score; and deploying, by the processor, the application module to the first set of heterogeneous nodes in response to the selection of the first set of heterogeneous nodes.

2. The method of claim 1, further comprising further adjusting the first adjusted diversity fitness score based on at least one of performance of the first set of heterogeneous nodes and power usage of the first set of heterogeneous nodes.

3. The method of claim 1, wherein the node property includes information related to runtime environments of the first set of heterogeneous nodes.

4. The method of claim 3, wherein identifying the first set of heterogeneous nodes in the computing system capable of executing the application module comprises:

identifying an application runtime environment associated with the application module; and identifying the first set of heterogeneous nodes as having the node property that matches the application runtime environment.

5. The method of claim 1, wherein identifying the node property of the first set of heterogeneous nodes comprises:
querying the first set of heterogeneous nodes and second set of heterogeneous nodes for the node property; and
in response to querying the first set of heterogeneous nodes and second set of heterogeneous nodes for the node property, receiving the node property from the first set of heterogeneous nodes and second set of heterogeneous nodes.

6. The method of claim 1, wherein receiving the command to deploy the application in the computing system comprises receiving a user command to deploy the application in the computing system.

7. The method of claim 1, wherein the first set of heterogeneous nodes comprises at least one of diverse hardware and diverse software.

8. The method of claim 1, wherein:
the application module comprises a first application module,
the application further comprises a second application module, and
the method further comprises:
identifying that the second set of heterogeneous nodes in the computing system is capable of executing the second application module; and
deploying the second application module to the second set of heterogeneous nodes.

9. A computing system, comprising:
a plurality of nodes;
an application comprising an application module; and
a management unit which executes in a processor from a memory, the management unit effective to:
associate the plurality of nodes with a node property, wherein the node property relates to functional capabilities of respective nodes;
receive a command to deploy the application in the computing system;
identify a first set of eligible nodes from the plurality of nodes and a second set of eligible nodes from the plurality of nodes, wherein the first set of eligible nodes and the second set of eligible nodes are capable of execution of the application module at least in part by utilization of the node property;
identify a first value of the node property for a first node of the first set of eligible nodes;
identify a second value of the node property for a second node of the first set of eligible nodes;
compare the first value and the second value to determine a first diversity fitness score for the first set of eligible nodes, wherein the first diversity fitness score represents a difference between the first value and the second value;
determine a first fault indicator related to the operation of the first set of eligible nodes, wherein the first fault indicator includes estimated probabilities of faults for the first set of eligible nodes;
adjust the first diversity fitness score based on the first fault indicator to produce a first adjusted diversity fitness score;
identify a third value of the node property for a third node of the second set of eligible nodes;
identify a fourth value of the node property for a fourth node of the second set of eligible nodes;
compare the third value and the fourth value to determine a second diversity fitness score for the second set of eligible nodes, wherein the second diversity fitness score represents a difference between the third value and the fourth value;
determine a second fault indicator related to the operation of the second set of eligible nodes, wherein the second fault indicator includes estimated probabilities of faults for the second set of eligible nodes;
adjust the second diversity fitness score based on the second fault indicator to produce a second adjusted diversity fitness score;
compare the first adjusted diversity fitness score for the first set of eligible nodes to the second adjusted diversity fitness score for the second set of eligible nodes;
determine that the first adjusted diversity fitness score is a greatest diversity fitness score among the first adjusted diversity fitness score and the second adjusted diversity fitness score;
select the first set of eligible nodes in response to the first adjusted diversity score being the greatest diversity fitness score; and
deploy the application module to the first set of eligible nodes in response to the selection of the first set of eligible nodes.

10. The computing system of claim 9, wherein to associate the plurality of nodes with the node property, the management unit is effective to:
query the plurality of nodes for the node property;
in response to the query of the plurality of nodes for the node property, receive respective values for the node property from the plurality of nodes; and
generate a diversity table that associates the plurality of nodes with the respective values for the node property.

11. The computing system of claim 10, wherein the application module is associated with an application runtime environment utilized to execute the application module, and wherein to identify the first set of eligible nodes from the plurality of nodes and the second set of eligible nodes from the plurality of nodes, the management unit is effective to identify, from the plurality of nodes, the first set of eligible nodes and the second set of eligible nodes which have a runtime environment that matches the application runtime environment according to the diversity table.

12. The computing system of claim 9, wherein the node property includes a first node property, and wherein the management unit is further effective to:
identify a second node property of the first set of eligible nodes and the second set of eligible nodes, wherein the second node property is different from the first node property;
identify a fifth value of the second node property for the first node;
identify a sixth value of the second node property for the second node;
compare the fifth value and the sixth value to determine a third diversity fitness score, wherein the third diversity fitness score represents a difference between the fifth value and the sixth value;
add the first adjusted diversity fitness score and the third diversity fitness score to produce a first total diversity fitness score;
identify a seventh value of the second node property for the third node;
identify a eighth value of the second node property for the fourth node;

compare the seventh value and the eighth value to determine a fourth diversity fitness score, wherein the fourth diversity fitness score represents a difference between the seventh value and the eighth value;
add the second adjusted diversity fitness score and the fourth diversity fitness score to produce a second total diversity fitness score; and
determine that the first total diversity fitness score is greater than the second total diversity fitness score, wherein the second total diversity fitness score is for the second set of nodes in the computing system, and
wherein the deployment of the application module to the first set of eligible nodes is further based on the determination that the first total diversity fitness score is greater than the second total diversity fitness score.

13. The computing system of claim 9, wherein the management unit, in response to execution by the processor, is effective to:
further adjust the first adjusted diversity fitness score based on performance of the first set of eligible nodes and power usage of the first set of eligible nodes.

14. The computing system of claim 9, wherein the node property includes at least one of operating system type, available memory, memory utilized, a hardware identifier, and a virtual machine identifier.

15. The computing system of claim 9, wherein to receive the command to deploy the application in the computing system, the management unit is effective to receive a system command to deploy the application in the computing system.

16. The computing system of claim 9, wherein the first set of eligible nodes includes diverse hardware and diverse software.

17. The computing system of claim 9, wherein the application further comprises a second application module; and wherein the management unit is further effective to:
identify that the second set of eligible nodes is capable of execution of the second application module at least in part by utilization of the node property of the second set of eligible nodes;
determine third diversity fitness scores for second groups of the second eligible nodes;
identify a second set of heterogeneous nodes corresponding to one of the second groups, wherein the second set of heterogeneous nodes has a highest diversity fitness score from the third diversity fitness scores; and
deploy the second application module to the second set of heterogeneous nodes.

18. A computing system, comprising:
a plurality of nodes;
an application comprising a first application module and a second application module; and
a management unit which executes in a processor from a memory, the management unit is effective to:
query the plurality of nodes for node properties, wherein the node properties relate to functional capabilities of respective nodes;
in response to the query of the plurality of nodes for the node properties, receive the node properties from the plurality of nodes;
generate a diversity table that associates the plurality of nodes with the node properties;
receive a command to deploy the application in the computing system;
identify first eligible nodes from the plurality of nodes, wherein the first eligible nodes are capable of execution of the first application module by utilization of the node properties of the first eligible nodes;
determine respective diversity fitness scores for groups of the first eligible nodes, wherein the respective diversity fitness scores for the groups of the first eligible nodes are based on determination of respective first difference values between node property values for each node property of the groups of the first eligible nodes;
determine first fault indicators related to operation of the groups of the first eligible nodes, wherein the first fault indicators include estimated probabilities of faults for the first eligible nodes;
adjust the respective diversity fitness scores for the groups of the first eligible nodes based on the first fault indicators to produce first adjusted diversity fitness scores;
identify a first set of heterogeneous nodes corresponding to one of the groups of the first eligible nodes, wherein the first set of heterogeneous nodes has a first highest diversity fitness score from the first adjusted diversity fitness scores;
select the first set of heterogeneous nodes in response to the first set of heterogeneous nodes having the first highest diversity fitness score from the first adjusted diversity fitness scores;
deploy the first application module to the first set of heterogeneous nodes in response to the selection of the first set of heterogeneous nodes;
identify second eligible nodes from the plurality of nodes, wherein the second eligible nodes are capable of execution of the second application module by utilization of the node properties of the second eligible nodes;
determine respective diversity fitness scores for groups of the second eligible nodes, wherein the respective diversity fitness scores for the groups of the second eligible nodes are based on determination of respective second difference values between node property values for each node property of the groups of the second eligible nodes;
determine second fault indicators related to operation of the groups of the second eligible nodes, wherein the second fault indicators include estimated probabilities of faults for the second eligible nodes;
adjust the respective diversity fitness scores for the groups of the second eligible nodes based on the second fault indicators to produce second adjusted diversity fitness scores;
identify a second set of heterogeneous nodes corresponding to one of the groups of the second eligible nodes, wherein the second set of heterogeneous nodes has a second highest fitness score from the second adjusted diversity fitness scores;
select the second set of heterogeneous nodes in response to the second set of heterogeneous nodes having the second highest diversity fitness score from the second adjusted diversity fitness scores; and
deploy the second application module to the second set of heterogeneous nodes in response to the selection of the second set of heterogeneous nodes.

19. The computing system of claim 18, wherein each of the plurality of nodes comprises a computing device.

* * * * *

UNITED STATES PATENT AND TRADEMARK OFFICE
CERTIFICATE OF CORRECTION

PATENT NO.         : 9,634,881 B2
APPLICATION NO.    : 13/264223
DATED              : April 25, 2017
INVENTOR(S)        : Kruglick It is certified that error appears in the above-identified patent and that said Letters Patent is hereby corrected as shown below:

In the Specification

In Column 1, Line 8, delete "§371" and insert -- § 371 --, therefor.

In Column 3, Line 16, delete "wide experiences" and insert -- node experiences --, therefor.

In the Claims

In Column 18, Line 31, in Claim 1, delete "related the" and insert -- related to --, therefor.

In Column 19, Line 6, in Claim 5, delete "and second" and insert -- and the second --, therefor.

In Column 19, Line 57, in Claim 9, delete "to the operation" and insert -- to operation --, therefor.

In Column 20, Line 6, in Claim 9, delete "to the operation" and insert -- to operation --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*